US008577039B2

(12) United States Patent
Matsuo

(10) Patent No.: US 8,577,039 B2
(45) Date of Patent: Nov. 5, 2013

(54) CRYPTOGRAPHIC COMMUNICATION APPARATUS AND CRYPTOGRAPHIC COMMUNICATION SYSTEM

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 10 days.

(21) Appl. No.: 13/455,992

(22) Filed: Apr. 25, 2012

(65) Prior Publication Data

US 2012/0275601 A1 Nov. 1, 2012

(30) Foreign Application Priority Data

Apr. 28, 2011 (JP) ................................ 2011-101076

(51) Int. Cl.
*H04K 1/04* (2006.01)
*H04L 9/00* (2006.01)
*H04L 9/08* (2006.01)

(52) U.S. Cl.
USPC ................ 380/268; 380/37; 380/43; 380/46; 380/282

(58) Field of Classification Search
USPC ................ 380/37, 43, 46, 268, 282
See application file for complete search history.

(56) References Cited

U.S. PATENT DOCUMENTS

2009/0307495 A1 12/2009 Matsuo

FOREIGN PATENT DOCUMENTS

JP 2009-296190 12/2009

*Primary Examiner* — Mohammad W Reza
(74) *Attorney, Agent, or Firm* — Dickinson Wright PLLC

(57) ABSTRACT

There is provided a cryptographic communication apparatus for conducting a key exchange procedure with another cryptographic communication apparatus that shares a password. The apparatus includes a first encryption unit that encrypts information that is based on a first random number using a public key of the another apparatus, a second encryption unit that encrypts the information that is based on the first random number encrypted by the first encryption unit using the password, a third encryption unit that encrypts information that is based on a second random number using the first random number, and transmits a first signal and a second signal to the another apparatus, the first signal including the information that is based on the first random number encrypted by the second encryption unit, and the second signal including information that is based on the second random number encrypted by the third encryption unit.

7 Claims, 7 Drawing Sheets

CRYPTOGRAPHIC COMMUNICATION APPARATUS AND CRYPTOGRAPHIC COMMUNICATION SYSTEM

BACKGROUND

1. Technical Field

The present invention relates to a cryptographic communication apparatus and a cryptographic communication system which conduct a key exchange procedure and an authentication procedure, and more particularly to a cryptographic communication apparatus and a cryptographic communication system, which conduct an SSL (secure socket layer) cryptographic communication and a password mutual-authentication protocol such as a password authenticated key exchange (hereinafter referred to as "PAKE authentication").

2. Description of the Related Art

In recent years, as secure communication methods, an SSL/TLS cryptographic communication has been popularized. The SSL/TLS cryptographic communication is very simply available, protected against the most dangerous man-in-the-middle attack in the cryptographic communication, and very high in security.

However, coping with the man-in-the-middle attack requires a mechanism of a PKI (public key infrastructure) used in a Server Certificate and a client certificate, and therefore is complicated in operation and increased in maintenance costs as compared with usual password authentication.

In recent years, as means for compensating the above drawbacks, the PAKE authentication has been increasingly studied. The PAKE authentication is a new authentication system which combines a public key cryptosystem and the password authentication together, differently from the conventional password authentication. With the use of the PAKE authentication, the inexpensive and simple password can be used to suppress the man-in-the-middle attack instead of the expensive and complicated PKI.

However, even if it is theoretically possible to realize the cryptographic communication and the authentication at the same time by only the PAKE authentication, actual operation is remarkably difficult. For that reason, there has been proposed a technique by which various communication devices such as firewalls and tools such as browser accept the SSL/TLS cryptographic communication, and conduct the PAKE authentication by using the mechanism of the widespread SSL/TLS cryptographic communication without any change. A client and a server conduct SSL/TLS negotiation (SSL/TLS handshake), and thereafter conduct the PAKE authentication, to thereby suppressing damage from the man-in-the-middle attack (refer to JP-A-2009-296190).

SUMMARY

However, if the PAKE authentication is used for the SSL/TLS cryptographic communication without any change, there is a need to conduct public key cryptography heavy in load for a computer at least twice for the purpose of exchanging a common key with another one. That is, the public key cryptography is conducted in a handshake procedure of the SSL/TLS, and further the public key cryptography is once again conducted for the purpose of conducting the PAKE authentication after the handshake procedure.

There is provided a cryptographic communication apparatus for conducting a key exchange procedure with another cryptographic communication apparatus that shares a password with the cryptographic communication apparatus, the cryptographic communication apparatus including: a random number generator that generates a first random number and a second random number; a first encryption unit that encrypts information that is based on the first random number by the aid of a public key of the another cryptographic communication apparatus; a second encryption unit that encrypts the information that is based on the first random number encrypted by the first encryption unit, by the aid of the password; a third encryption unit that encrypts information that is based on the second random number by the aid of the first random number; and a transmitter that transmits a first signal and a second signal to the another cryptographic communication apparatus, the first signal including the information that is based on the first random number encrypted by the second encryption unit, and the second signal including the information that is based on the second random number encrypted by the third encryption unit.

DETAILED DESCRIPTION (First Embodiment)

Hereinafter, a first embodiment will be described with reference to the accompanying drawings.

Figure 1:
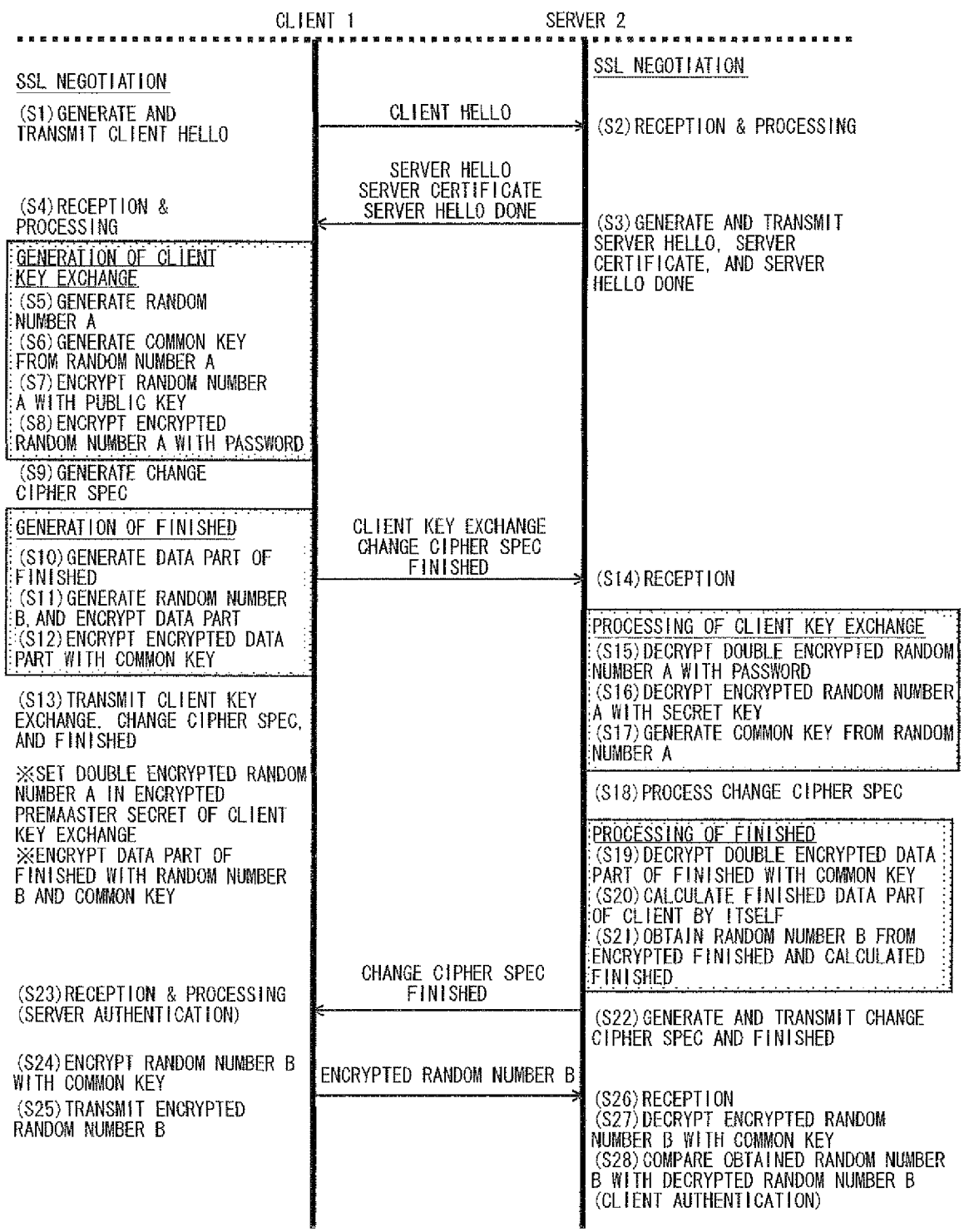
FIG. 1 is a sequence diagram illustrating a PAKE authentication according to a first embodiment.

FIG. 1 is a sequence diagram illustrating a PAKE authentication according to a first embodiment. In this example, a client 1 and a server 2 conduct a PAKE authentication during an SSL/TLS negotiation (also called "SSL/TLS handshake", "SSL negotiation", or "SSL handshake"). For simplification of description, a public key cryptography is described as an RSA (Rivest Shamir Adieman) cryptography. Also, the configurations of the client 1 and the server 2 will be described in detail with reference to FIGS. 2 and 5. The client 1 and the server 2 are examples of the cryptographic communication apparatus.

The client 1 generates and transmits Client Hello to the server 2 (Step S1). The server 2 receives and processes the Client Hello (Step S2). Then, the server 2 generates and transmits Server Hello, Server Certificate (including information on a public key), and Server Hello Done to the client 1 (Step S3). The client 1 receives and processes those messages. The client 1 acquires the public key from the Server Certificate (Step S4).

The client 1 generates a random number A (first random number) in order to generate Client Key Exchange. A data length of the random number A is equal to a data length of a modulus in an RSA cryptography (Step S5).

The client 1 generates a common key from the random number A. In more detail, the client 1 treats last 48 bytes within the random number A as a premaster secret. Which portion within the random number A should be treated as the premaster secret is not fundamentally problematic, and another portion may be treated as the premaster secret. In this example, the last 48 bytes are treated as the premaster secret in order to conform to the specification of the SSL/TLS cryptographic communication.

Subsequently, a master secret is generated from the premaster secret, and the common key to be used in a common key cryptosystem is generated from the master secret (Step S6). In the present specification, the common key is, for example, a general name of the following keys, which will be described below.

client_write_MAC_secret
 server_write_MAC_secret
 client_write_key
 server_write_key
 client_write_IV (necessary only when block encryption is used)
 server_write_IV (necessary only when block encryption is used)

Subsequently, the random number A is encrypted with the public key (Step S7). In this embodiment, the random number A is encrypted with the public key. However, the present invention is not limited to the random number A, and any information from which the random number A can be calculated by the server 2 is applicable.

The above encryption procedure is different from the specification of the normal SSL/TLS cryptographic communication, and therefore differences therefrom will be described below.

In the SSL/TLS cryptographic communication of Version 3.0 and the subsequent versions, the premaster secret is configured by version information of 2 bytes and a random number D of 46 bytes as will be described below.

```
struct {
    Protocol Version client_version:    ← version information (2 bytes)
    opaque random [46];    ← random number D (46 bytes)
} PreMasterSecret;    ← premaster secret
```

Accordingly, the version information is not set in the premaster secret generated from the random number A. This is different from the specification of the SSL/TLS cryptographic communication.

Subsequently, in the SSL/TLS cryptographic communication, the premaster secret is shaped by an encryption block formatting of "PKCS#1 version 1.5" as described below.

00∥02∥ string padding (random number E without 00)
 ∥00∥ PreMasterSecret

In this case, a symbol ∥ means concatenating of data.

The overall data length is equal to the data length of the modulus in the RSA cryptography, and therefore the data length of the random number E is expressed as follow.

Data length of random number E=data length of modulus-3-48

In the SSL/TLS cryptographic communication, the premaster secret subjected to the encryption block formatting is encrypted with the public key.

On the other hand, the random number A is equal to the data length of the modulus, and a structure of the random number A is described as follows.

random number A=(random number C∥ PreMaster Secret)

The data length of the random number C is shorter than the data length of the modulus by the data length of the premaster secret, that is, 48 bytes.

Thus, a portion of "00∥02∥ string padding (random number E without 00) ∥00" is replaced with "random number C", which is different from the specification of the SSL/TLS cryptographic communication.

That is, the random number A is not formatted with the setting of the version information in the premaster secret defined in the specification of the SSL/TLS cryptographic communication, and the encryption block formatting of "PKCS #1 version 1.5"

The data is not shaped by the encryption block formatting of "PKCS#1 version 1.5".

However, in the above configuration, a mala fide third party may spoof the client, deliver a specific Encrypted PreMaster Secret such as 0 or 1 to the server 2, catch Finished returned by the server 2, and analogize a password. In order to avoid this, the server 2 can treat such a simple Encrypted PreMaster Secret as an error, or contrive a method of encrypting the password. That is, even if the Encrypted PreMaster Secret is 0 or 1, if a complicated value appears when the Encrypted PreMaster Secret is decrypted with the password, there arises no problem.

Also, the reason that the random number A is not formatted with the setting of the version information in the premaster secret, and the encryption block formatting of "PKCS #1 version 1.5" is to suppress the offline attack.

When the mala fide third party spoofs an authorized server (that is, the mala fide third party operates as the server 2, the mala fide third party can deliver a public key paired with a secret key held by himself to the client. Accordingly, the mala fide third party enables decryption in the public key encryption.

On the other hand, in the case of the password, if offline, because the password is generally as long as can be stored, the password is shorter in the bit length than the cryptographic key, which does not make it difficult for the mala fide third party to check all of the combinations taken by the password in a round-robin.

The mala fide third party spoofs the authorized server and acquires the double encrypted random number A from the client 1. Then, the mala fide third party sets a tentative password, and decrypts the double encrypted random number A with the tentative password and the secret key held by himself. If version information or a format is included in the random number A, it can be determined whether the assumed password is correct, or not, according to whether the version information or the format appears, or not.

If the mala fide third party sets the tentative passwords one after the other offline, the mala fide third party can find the password where the version information or the format appears in the random number A at any time point (offline attack).

As described above, in order to prevent the offline attack, version information setting or formatting is not conducted in the random number A.

Subsequently, the random number A encrypted with the public key is further encrypted with the password to obtain the double encrypted random number A (Step S8). This procedure is not conducted in the SSL/TLS cryptographic communication, but is conducted for the PAKE authentication.

Client Key Exchange is generated with the double encrypted random number A as an Encrypted PreMaster Secret. In this case, the Client Key Exchange is an example of a first signal, and also a key exchange signal for transmitting the random number A to the server 2.

Change Cipher Spec is generated (Step S9) to generate a data part of a clear text of the Finished (Step S10). In this example, the Finished is an example of a second signal, and also a validation signal for transmitting validation data.

The client 1 generates a random number B (second random number), and encrypts a portion (including MAC) to be encrypted with the common key, with the random data B, in at least the data part of the Finished. It is assumed that the encryption by the random number B is conducted by an XOR procedure in this example (Step S11). The encryption procedure by the random number B is also different from the specification of the SSL/TLS cryptographic communication.

In this example, the reason that the data part of the Finished is encrypted with the random number B is to suppress the above-mentioned offline attack. If the client 1 transmits the Finished not encrypted with the random number B to the server 2, when the mala fide third party spoofs the authorized server, there is a possibility that the offline attack is accomplished.

If the mala fide third party sets the tentative passwords one after the other offline, and calculates the Finished by himself, the mala fide third party compares the calculated Finished with the Finished received from the client 1 to enable a correct password to be found out at any time point.

The data part encrypted with the random number B is further encrypted with the common key to doubly encrypt the data part (Step S12). In this example, the encryption is conducted in conformity to the specification of the SSL/TLS cryptographic communication in order to prevent the data part from being blocked by the firewall. That is, although encryption by the common key may be eliminated, the client 1 conducts encryption with the common key on the basis of the specification of the SSL/TLS cryptographic communication.

The client 1 transmits the Client Key Exchange, the Change Cipher Spec, and the Finished to the server 2 (Step S13).

The server 2 receives the Client Key Exchange, the Change Cipher Spec, and the Finished from the client 1 (Step S14).

The server 2 decrypts the double encrypted random number A set in the Encrypted PreMaster Secret of the Client Key Exchange with the password, and obtains the random number A encrypted with the public key (Step S15). This procedure is not conducted in the SSL/TLS cryptographic communication, but is conducted for the PAKE authentication.

The server 2 decrypts the random number A encrypted with the public key, with the secret key (Step S16).

The server 2 treats last 48 bytes within the random number A as the premaster secret. Which portion within the random number A should be treated as the premaster secret is not fundamentally problematic, and another portion may be treated as the premaster secret. In this example, the last 48 bytes are treated as the premaster secret in order to conform to the specification of the SSL/TLS cryptographic communication.

Subsequently, the master secret is generated from the premaster secret, and the common key to be used in the common key cryptosystem is generated from the master secret.

As described above, the random number A is not formatted with the setting of the version information in the premaster secret, and the encryption block formatting of "PKCS #1 version 1.5". Therefore, the server 2 does not conduct this check. This is also different from the specification of the SSL/TLS cryptographic communication.

The server 2 treats the Change Cipher Spec (Step S18), and decrypts the double encrypted data part of the Finished with the common key (Step S19).

Then, the server 2 calculates the data part of the Finished which is generated by the client 1, uniquely.

The server 2 compares the data part of the Finished with the random number B with the data part of the Finished which is calculated by itself to obtain the random number B. This is also different from the specification of the SSL/TLS cryptographic communication (Step S21).

If the client 1 can present the random number B to the server 2, it can be proved that the Finished presented to the server 2 by the client 1 is correct. Therefore, the random number B is treated as authentication data for confirming whether the client is the authorized server, or not, that is, for client authentication.

The server 2 generates the Change Cipher Spec and the Finished, and transmits the Change Cipher Spec and the Finished to the client 1. The generation of the Finished conforms to the specification of the SSL/TLS cryptographic communication (Step S22).

The client 1 receives the Change Cipher Spec and the Finished from the server 2, and treats the Change Cipher Spec and the Finished from the server 2. Then, with the treatment of the Finished, the client 1 can authenticate the server 2 (Step S23). In this situation, the SSL handshake is established. That is, in subsequent communications between the client 1 and the server 2, the common key encryption is used.

The client 1 encrypts the random number B with the common key (Step S24), and transmits the encrypted random number B to the server 2 (Step S25). Since this encryption conforms to the specification of the SSL/TLS cryptographic communication, the MAC is generated and encrypted.

The random number B may be transmitted in the form of a plain text without any danger, and does not need to be encrypted, but conforms to the specification of the SSL/TLS cryptographic communication.

The server 2 receives the encrypted random number B from the client 1 (Step S26), and decrypts the encrypted random number B with the common key (Step S27). This decryption conforms to the specification of the SSL/TLS cryptographic communication, and therefore the MAC is checked.

The server 2 compares (checks) the random number B calculated by itself with the decrypted random number B, and determines whether the client 1 is the authorized client knowing the password, or not.

If the encryption by the random number B is not the XOR procedure, the server 2 saves data decrypted in Step S19 and data generated in Step S20. At the time of acquiring the random number B, the server 2 encrypts the data generated in Step S20 with the random number B, and then compares the data encrypted with the random number B with the data decrypted in Step S19.

In the above description, in the order of encrypting the data part of the Finished, the random number B is first encrypted, and the common key is then encrypted. However, the order can be reversed. However, the procedure is somewhat complicated. Also, as described above, the data part of the Finished may be encrypted with only the random number B without being doubly encrypted.

The random number B may be left as it is, or formatted. The random number A is not formatted with the setting of the version information in the premaster secret, and the encryption block formatting of "PKCS #1 version 1.5". Therefore, the server 2 cannot know whether the received data has a deficiency or undergoes version rollback attacks, or not.

Under the circumstances, it is desirable that the version information or the encryption block formatted data is encrypted with the random number B as the common key through an appropriate common key encryption scheme, and set as new authentication data. A specific procedure of this portion will be described later with reference to FIG. 7.

As described above, in this embodiment, the PAKE authentication can be conducted by merely partially altering the specification of the SSL/TLS cryptographic communication.

Similarly, in this embodiment, a data format transmitted or received over the network conforms to the specification of the SSL/TLS cryptographic communication (although the Encrypted PreMaster Secret in FIG. 1 and the Finished transmitted by the client 1 in FIG. 1 do not conform to the SSL/TLS cryptographic communication, a third party cannot determine whether those messages conform to the SSL/TLS cryptographic communication, or not, because of the encrypted data). Therefore, the SSL/TLS negotiation illustrated in FIG. 1 looks like a normal SSL/TLS negotiation seen from the third party.

Accordingly, if the firewall accepts the SSL/TLS cryptographic communication, the PAKE authentication can be conducted without blocking a communication.

Moreover, although the PAKE authentication is conducted in the SSL/TLS cryptographic communication, since the public key encryption is implemented only once, a load on the device is small.

In FIG. 1, the client authentication is conducted immediately after the SSL/TLS negotiation. However, the client authentication may be conducted at any time. At a time point when the client authentication becomes necessary, the client authentication may be conducted in response to a sign from the server.

Accordingly, the random number B can be used as a one-time-password. In other words, the SSL/TLS negotiation of FIG. 1 can be treated as one-time-password generating means.

When the SSL/TLS negotiation is treated as only the one-time-password generating means, and the cryptographic communication is not conducted, a premaster key or a master key can be treated as the one-time-password instead of the random number B. However, a message forgery in the SSL/TLS negotiation cannot be checked.

Also, the above-mentioned data part of the Finished is information related to data on past exchange (hereinafter called "SSL handshake data") in the SSL handshake between the client 1 and the server 2, as with the procedure of the normal SSL handshake. That is, the SSL handshake data before Step S10 in which the data part of the Finished is generated is the Client Hello, the Server Hello, the Server Certificate, and the Server Hello Done. Therefore, the client 1 generates the data part of the Finished on the basis of those signals.

On the other hand, the server 2 can calculate the data part of the Finished to be generated from the client 1 by itself because the Client Hello, the Server Hello, the Server Certificate, and the Server Hello Done are information that has been already communicated with the client 1. That is, the data part of the Finished is known data even for the server 2. As a result, the random number B can be calculated by the aid of the data part of the Finished which is known data.

Then, the Finished (second signal) is used as an authentication signal in the general SSL handshake. That is, the server 2 can check the data part of the Finished which is decrypted with the common key against the data part generated by itself to authenticate whether the SSL handshake has been correctly conducted, or not. For example, when the cryptosystem conducted in the SSL cryptographic communication has been changed by the mala fide third party without any permission during the SSL handshake, the server 2 can be aware of this fact when receiving the Finished.

Also, in Step S7, the random number A is encrypted with the public key, but the random number A may be replaced with information that is based on the random number A. That is, the random number A can be replaced with information from which the common key generated from the random number A can be calculated, without being particularly limited.

Also, in Step S11, the information that is based on the random number B may be encrypted with the common key. The information that is based on the random number B may be the random number B per se, hashed random number B, or the data part encrypted with the random number B as in this embodiment.

Also, in Step S22, that the server 2 generates the Finished, and transmits the generated Finished to the client 1 means that the random number B could be calculated. That is, in Step S23, the client 1 can authenticate that the server 2 is the authorized server having the password by receiving the Finished. A method of proving that the server 2 has the password is not limited to the above manner. The server 2 may transmit the information from which the random number B can be calculated to the client 1. With the above configuration, the client 1 can authenticate the server 2 on the basis of the random number B.

Also, in this embodiment, the Client Key Exchange which is the key exchange signal, and the Finished which is a signal for transmitting the random number. B and the authentication data are sequentially transmitted according to the specification of the SSL. That is, the client 1 does not receive a signal from the server 2 between the Client Key Exchange and the Finished. That is, the client 1 transmits the Finished which is the authentication data without waiting for a reply from the server 2 after transmission of the Client Key Exchange. For that reason, the client 1 can conduct the password authentication with the server 2 with a reduction in time. The client 1 may transmit the Client Key Exchange and the Finished at the same time, or as one signal.

Figure 2:
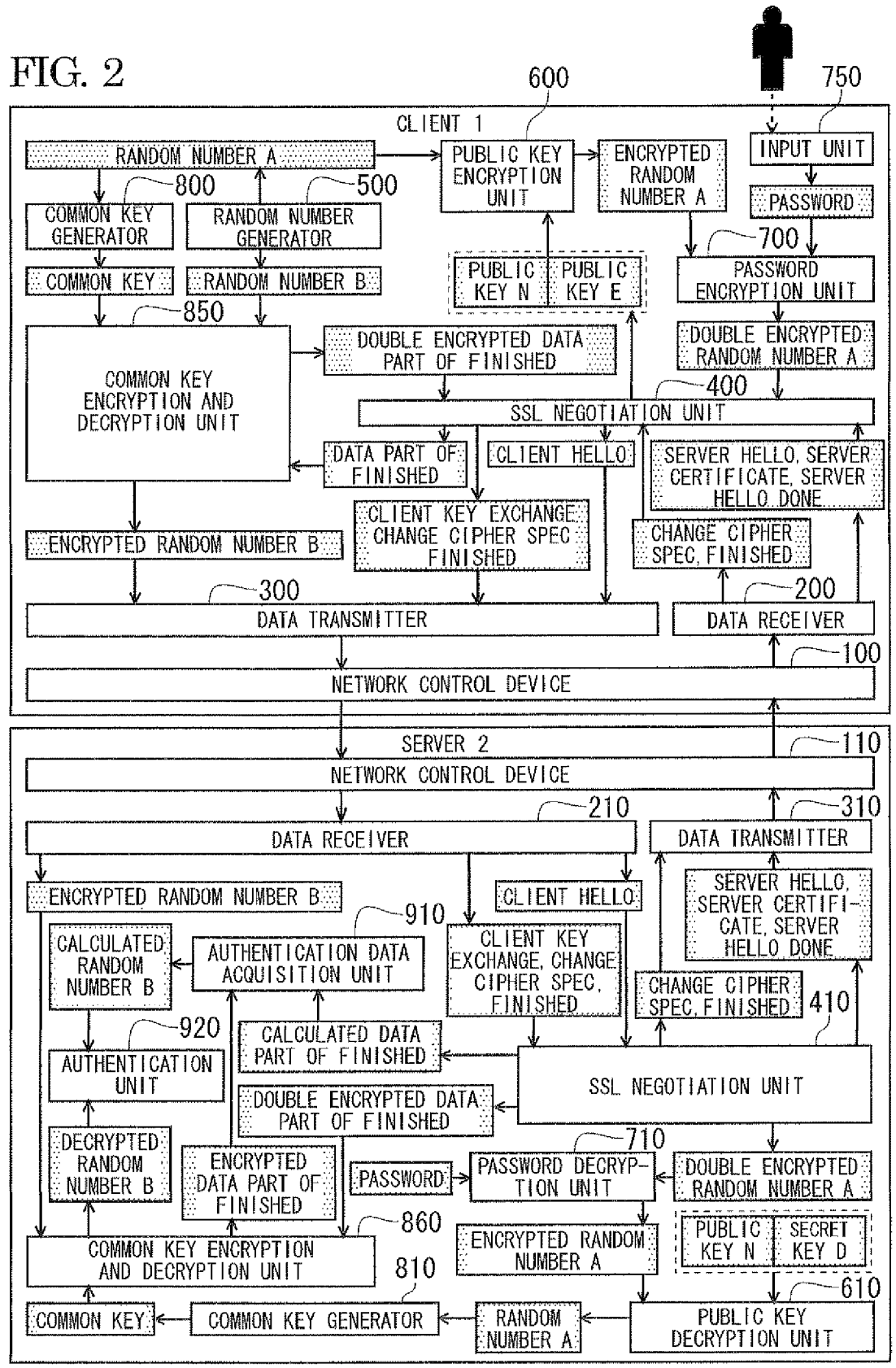
FIG. 2 is a block diagram illustrating a first example of a functional block of a client and a server according to the first embodiment.
Figure 3:
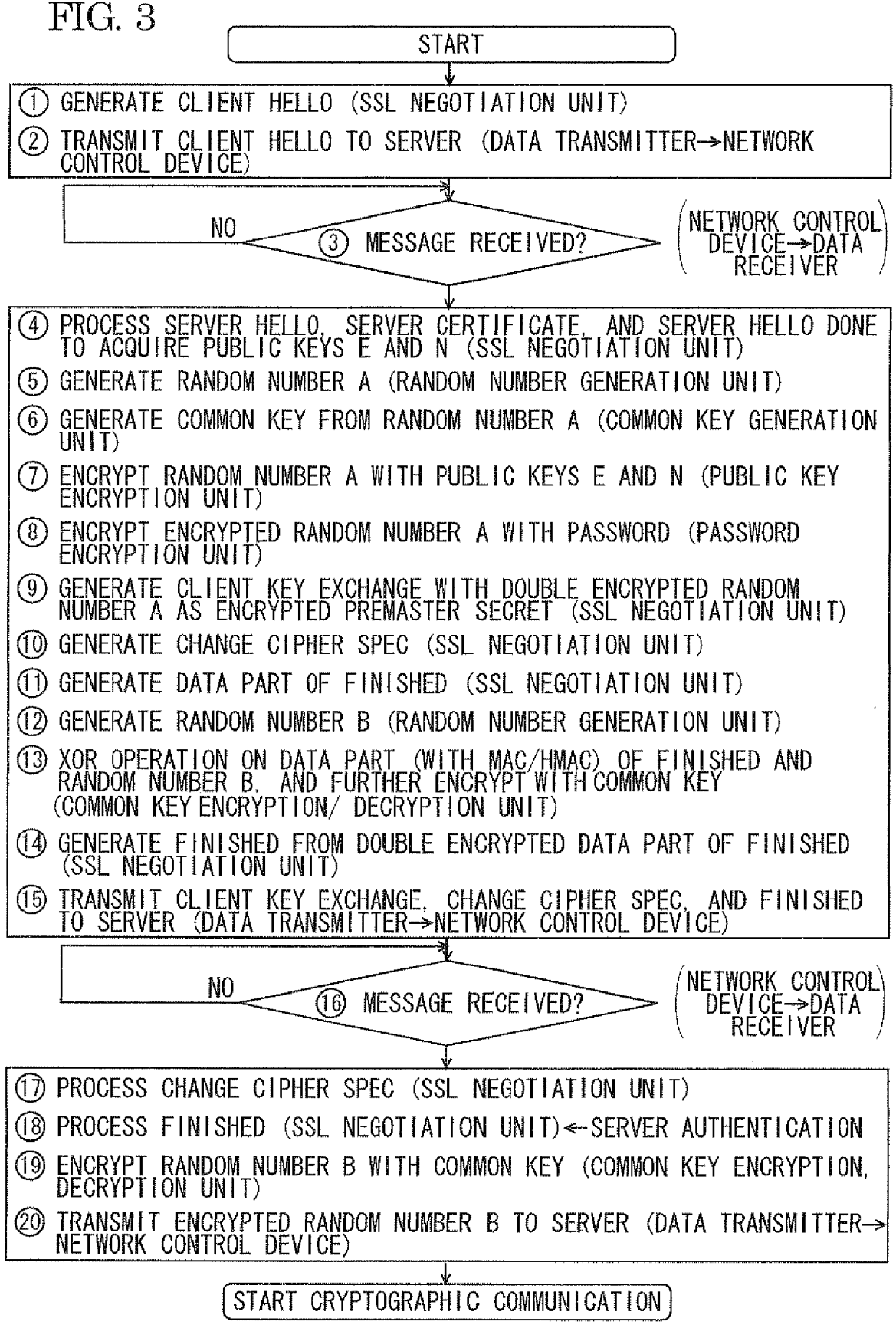
FIG. 3 is a flowchart of a client side according to the first embodiment.
Figure 4:
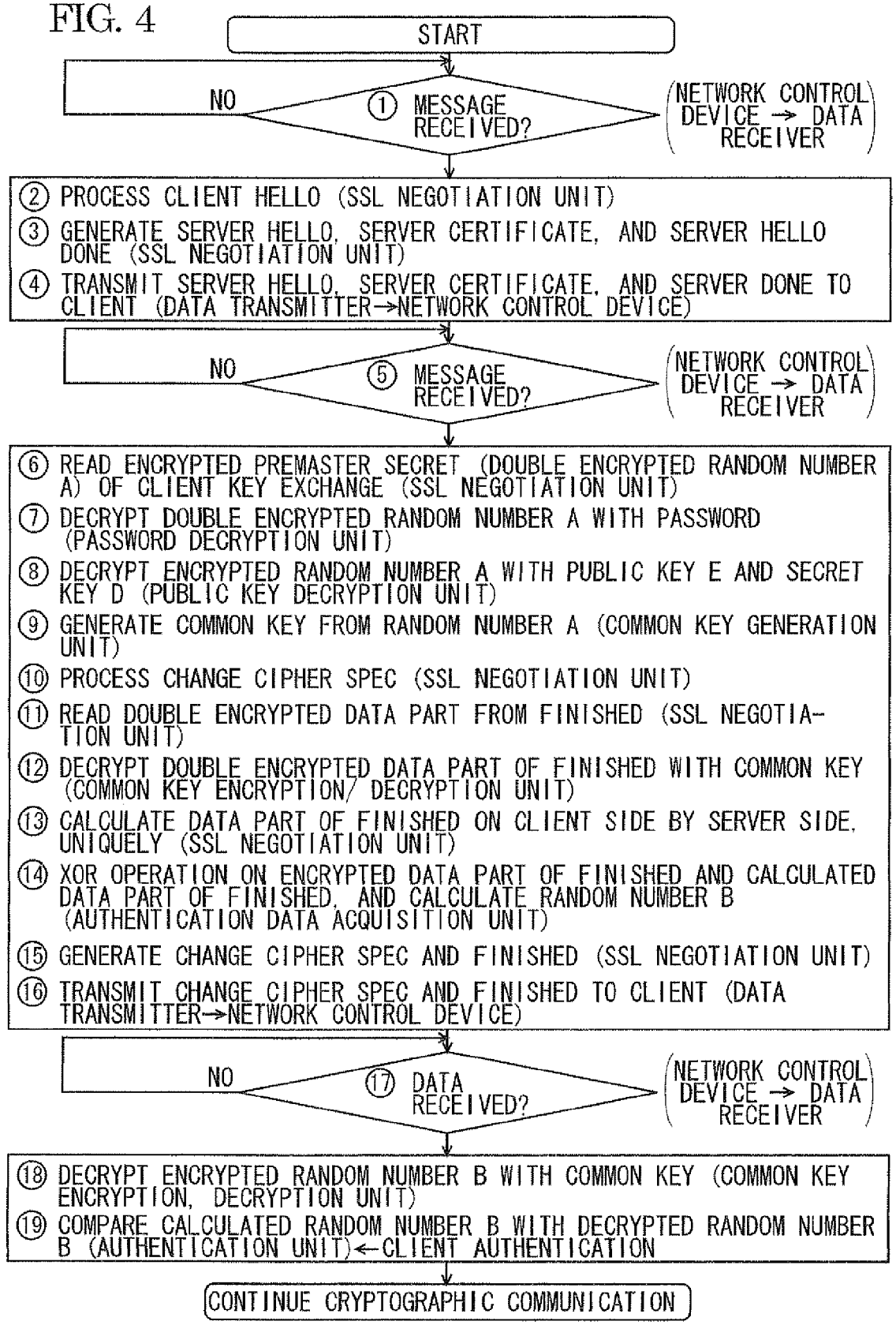
FIG. 4 is a flowchart of a server side according to the first embodiment.

FIG. 2 is a block diagram illustrating a first example of a functional block of a client and a server according to the first embodiment. FIG. 3 is a flowchart of a client side according to the first embodiment. FIG. 4 is a flowchart of a server side according to the first embodiment. Subsequently, a description will be given with reference to FIGS. 2, 3, and 4. Also, the following description corresponds to Steps S1 to S28 described with reference to FIG. 1.

The client 1 conducts the SSL/TLS cryptographic communication and the PAKE authentication with the server 2 over the network.

(FIG. 3-(1)) First, an SSL negotiation unit 400 generates Client Hello message, and transmits the message to a data transmitter 300 (Step S1).

(FIG. 3-(2)) The data transmitter 300 transmits the Client Hello message to the server 2 through a network control device 100 (Step S1).

(FIG. 3-(3)) Thereafter, the client 1 waits for the message from the server 2.

(FIG. 4-(1)) The server 2 starts with a message waiting state of the client 1. A data receiver 210 receives the Client Hello message transmitted by the client 1 through a network control device 110. The data receiver 210 transmits the Client Hello message to an SSL negotiation unit 410 that interprets (treats) the Client Hello message.

(FIG. 4-(2)) The SSL negotiation unit 410 treats the Client Hello message (Step S2).

(FIG. 4-(3)) The SSL negotiation unit 410 generates the service hello, the Server Certificate (with information on public key), and the Server Hello Done, and transmits those messages to a data transmitter 310 (Step S3).

(FIG. 4-(4)) The data transmitter 310 transmits the Server Hello, Server Certificate, and Server Hello Done messages to the client 1 through the network control device 110 (Step S3).

(FIG. 4-(5)) Thereafter, the server 2 again waits for the message from the client 1.

(FIG. 3-(3)) A data receiver 200 of the client 1 receives the Server Hello, Server Certificate, and Server Hello Done messages transmitted by the server 2 through the network control device 100. The data receiver 200 transmits the Server Hello, Server Certificate, and Server Hello Done messages to the SSL negotiation unit 400 that interprets (treats) the Server Hello, Server Certificate, and Server Hello Done messages.

(FIG. 3-(4)) The SSL negotiation unit 400 treats the Server Hello, Server Certificate, and Server Hello Done messages to acquire a public key E and a public key N (modulus) (Step S4). The SSL negotiation unit 400 may check the Server Certificate, or not.

(FIG. 3-(5)) The SSL negotiation unit 400 instructs a random number generator 500 to generate the random number A (Step S5). A data length of the random number A is equal to the data length of the public key N (modulus).

(FIG. 3-(6)) A common key generator 800 treats last 48 bytes within the random number A as the premaster secret, and generates the master secret from the premaster secret. Then, the common key generator 800 generates a common key used in the common key cryptosystem from the master secret. Then, the common key generator 800 transfers the common key to a common key encryption and decryption unit 850 that conducts the encryption, decryption, and the MAC procedure (Step S6).

(FIG. 3-(7)) A public key encryption unit 600 encrypts the random number A with the public key E and the public key N (Step S7).

(FIG. 3-(8)) A password encryption unit 700 encrypts the random number A encrypted with the public key, with the password to obtain the double encrypted random number A (Step S8). The procedure is not conducted in the SSL/TLS cryptographic communication, but is conducted for the PAKE authentication.

Although not shown in the flowchart, this password can be set as a password stored in the client 1 through an input unit 750 that receives the password. In this case, a moment at which the password is input is previous or at a time point when the password is required.

(FIG. 3-(9)) The SSL negotiation unit 400 generates the Client Key Exchange with the double encrypted random number A as the Encrypted PreMaster Secret.

(FIG. 3-(10)) Subsequently, the SSL negotiation unit 400 generates the Change Cipher Spec (Step S9).

(FIG. 3-(11)) Subsequently, the SSL negotiation unit 400 generates the data part of the Finished message (without MAC) (Step S10).

(FIG. 3-(12)) The SSL negotiation unit 400 instructs the random number generator 500 (random number generating means) to generate the random number B. The random number B is transferred to the common key encryption and decryption unit 850 (common key encrypting means) (Step S11).

(FIG. 3-(13)) The common key encryption and decryption unit 850 (common key encrypting means) obtains the MAC of the data part of the Finished message which is delivered from the SSL negotiation unit 400, XORs the data part (with MAC) of the Finished message and the random number B, and encrypts the data part (with MAC) of the Finished message (Step S11). Also, the common key encryption and decryption unit 850 encrypts the encrypted data part (with MAC) of the Finished message with the common key to obtain the double encrypted data part (with MAC) of the Finished message (Step S12).

(FIG. 3-(14)) The SSL negotiation unit 400 generates the Finished message from the double encrypted data part (with MAC) of the Finished message. Then, the SSL negotiation unit 400 transmits the generated Client Key Exchange, Change Cipher Spec, and Finished messages to the data transmitter 300.

(FIG. 3-(15)) The data transmitter 300 transmits the Client Key Exchange, Change Cipher Spec, and Finished messages to the server 2 through the network control device 100 (Step S13).

(FIG. 3-(16)) Thereafter, the client 1 waits for the message from the server 2.

(FIG. 4-(5)) The data receiver 210 receives the Client Key Exchange, Change Cipher Spec, and Finished messages transmitted by the client 1 through the network control device 110 (Step S14). The data receiver 210 transmits the Client Key Exchange, Change Cipher Spec, and Finished messages to the SSL negotiation unit 410 that interrupts the Client Key Exchange, Change Cipher Spec, and Finished messages.

(FIG. 4-(6)) The SSL negotiation unit 410 reads the Encrypted PreMaster Secret, that is, the double encrypted random number A from the Client Key Exchange message.

(FIG. 4-(7)) A password decryption unit 710 decrypts the double encrypted random number A with the password, to thereby obtain the random number A encrypted with the public key E and the public key N (Step S15).

(FIG. 4-(8)) A public key decryption unit 610 decrypts the random number A encrypted with the public key E and the public key N, with a secret key D paired with the public key E and the public key N to obtain the random number A (Step S16).

(FIG. 4-(9)) A common key generator 810 treats last 48 bytes within the random number A as the premaster secret, and generates the master secret from the premaster secret. Then, the common key generator 810 generates a common key used in the common key cryptosystem from the master secret. Then, the common key generator 810 transfers the common key to a common key encryption and decryption unit 860 that conducts the encryption, decryption, and the MAC procedure (Step S17).

As described above, the random number A is not formatted with the setting of the version information in the premaster secret and the encryption block formatting of "PKCS #1 version 1.5". Therefore, the SSL negotiation unit 410 does not conduct this check, which is different from the specification of the SSL/TLS cryptographic communication.

(FIG. 4-(10)) The SSL negotiation unit 410 treats the Change Cipher Spec message (Step S18).

(FIG. 4-(11)) The SSL negotiation unit 410 reads the double encrypted data part (with MAC) from the Finished message. Then, the SSL negotiation unit 410 transfers the double encrypted data part (with MAC) to the common key encryption and decryption unit 860.

(FIG. 4-(12)) The common key encryption and decryption unit 860 decrypts the double encrypted data part (with MAC) with the common key to obtain the data part (with MAC) encrypted with the random number B (Step S19).

(FIG. 4-(13)) The SSL negotiation unit 410 calculates the data part (with MAC) of the Finished to be generated by the client by itself (Step S20). Also, although not shown, the SSL negotiation unit 410 delivers the data part (without MAC) of the Finished to the common key encryption and decryption unit 860, calculates the MAC of the data part (without MAC) of the Finished, and acquires the data part (with MAC) of the Finished.

(FIG. 4-(14)) An authentication data acquisition unit 910 XORs the data part of the Finished which is encrypted (XORed) with the random number B and the data part of the Finished which is calculated by the SSL negotiation unit 410 to obtain the random number B (Step S21).

(FIG. 4-(15)) The SSL negotiation unit 410 generates the Change Cipher Spec and the Finished messages, and transmits those messages to the data transmitter 310 (Step S22).

(FIG. 4-(16)) The data transmitter 310 transmits the Change Cipher Spec and the Finished messages to the client 1 through the network control device 110 (Step S22).

(FIG. 4-(17)) Thereafter, the server 2 again waits for the message from the client 1.

(FIG. 3-(16)) The data receiver 200 of the client 1 receives the Change Cipher Spec and Finished messages transmitted by the server 2 through the network control device 100. The data receiver 200 transmits the Change Cipher Spec and Finished messages to the SSL negotiation unit 400 that interrupts the Change Cipher Spec and Finished messages (Step S23).

(FIG. 3-(17)) The SSL negotiation unit 400 treats the Change Cipher Spec message.

(FIG. 3-(18)) The SSL negotiation unit 400 treats the Finished message. The SSL negotiation unit 400 treats the Finished message whereby the client 1 can authenticate the server 2 (Step S23).

(FIG. 3-(19)) The common key encryption and decryption unit 850 encrypts the random number B with the common key, and transmits the encrypted random number B to the data transmitter 300 (Step S24).

(FIG. 3-(20)) The data transmitter 300 transmits the random number B encrypted with the common key to the server 2 through the network control device 100 (Step S25). This encryption conforms to the specification of the SSL/TLS cryptographic communication, and therefore also generates and encrypts the MAC. The random number B may be transmitted in the form of a clear text without any danger, and does not need to be encrypted, but conforms to the specification of the SSL/TLS cryptographic communication.

(FIG. 4-(17)) The data receiver 210 receives the random number B encrypted with the common key transmitted by the client 1 through the network control device 110. The data receiver 210 transmits the random number B encrypted with the common key to the common key encryption and decryption unit 860 (Step S26).

(FIG. 4-(18)) The common key encryption and decryption unit 860 decrypts the encrypted random number B with the common key, and obtains the random number B (Step S27).

(FIG. 4-(19)) An authentication unit 920 compares (checks) the random number B calculated by itself with the decrypted random number B, and determines whether the client is the authorized client knowing the password, or not (Step S28).

Figure 7:
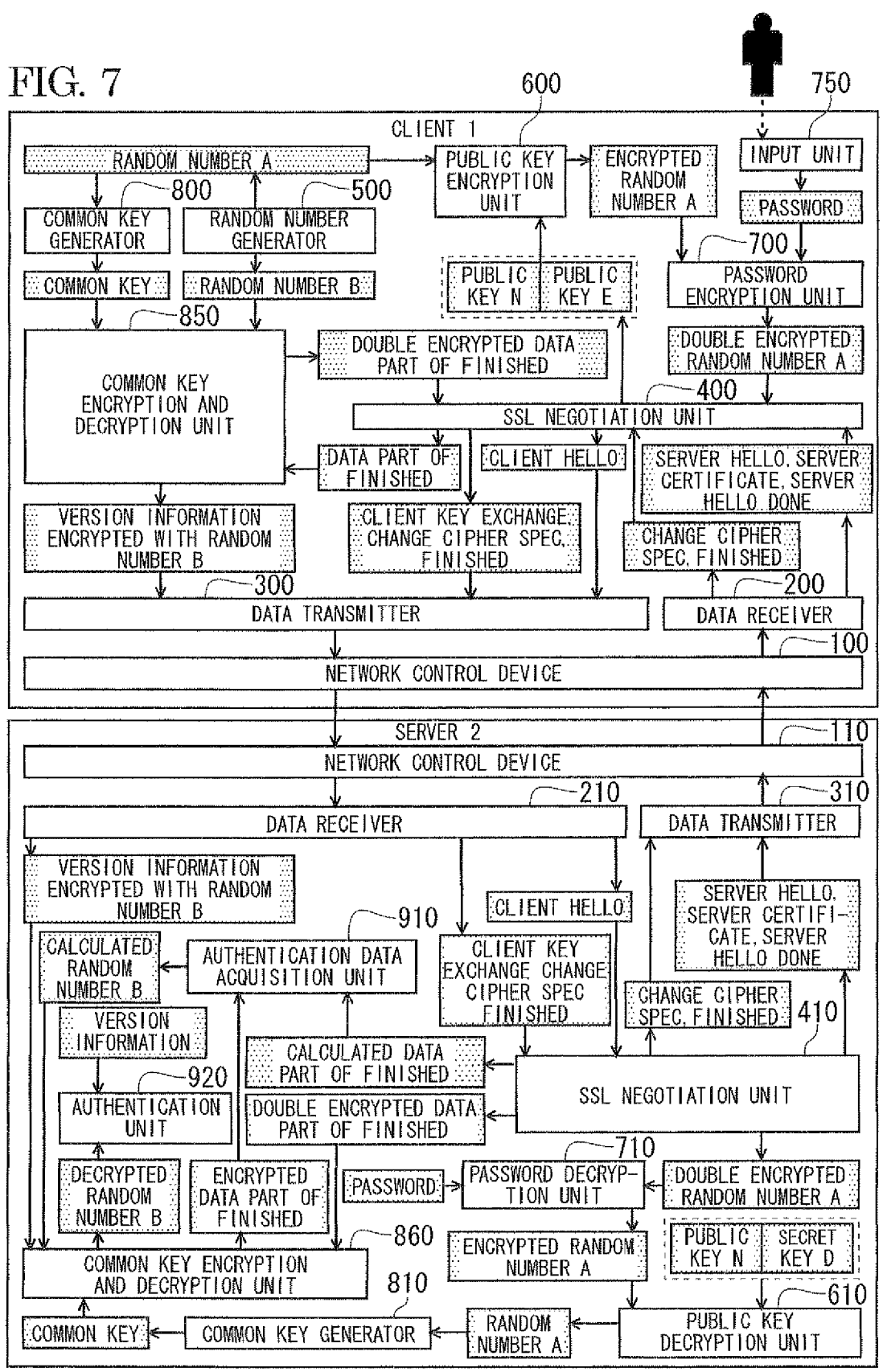
FIG. 7 is a block diagram illustrating a second example of a functional block of the client and the server according to the first embodiment.

Subsequently, another example of the configurations of the client 1 and the server 2 will be described with reference to FIG. 7. FIG. 7 is a diagram illustrating the second example of a functional block of the client and the server according to the first embodiment of the present invention.

In this example, the version information is encrypted with the random number B as the common key, and the version information thus encrypted is set as authentication data instead of the random number B.

The client 1 transfers, to the server 2, the version information encrypted with the random number B as the common key by the common key encryption and decryption unit 850 (common key encrypting means) instead of the random number B encrypted with the common key.

The server 2 decrypts the version information encrypted with the random number B, with the random number B calculated in the common key encryption and decryption unit 860 (common key encrypting means) as the common key, and compares the version information thus obtained with desired version information by an authentication unit 920. It is preferable that the common key encryption is not simple encryption such as the XOR procedure, but complicated common key encryption that cannot be subjected to back calculation. In FIGS. 2 and 7, for facilitation of description, the functional block that conducts encryption and (or) decryption is divided into a plurality of pieces for description. However, it is needless to say that one functional block may conduct a plurality of encryption procedures and (or) decryption procedures.

Figure 5:
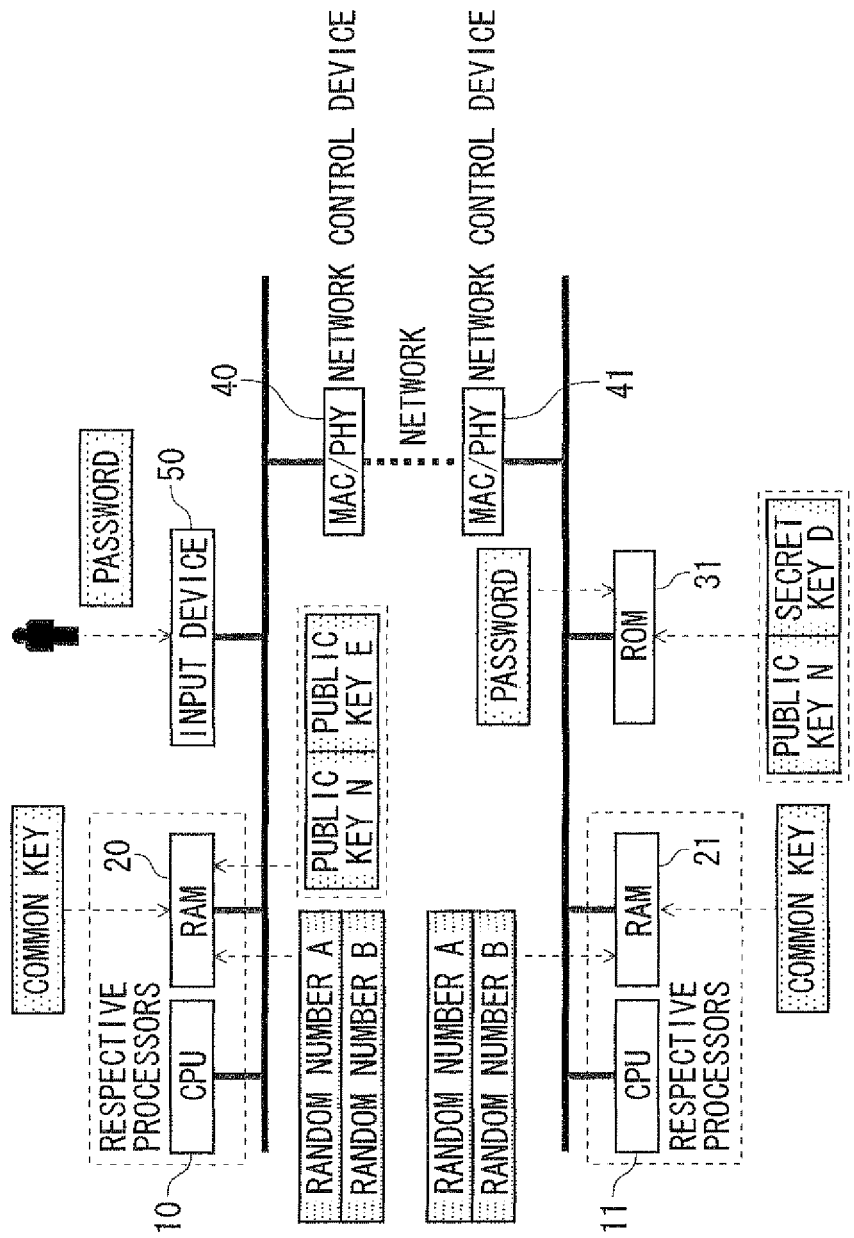
FIG. 5 is a diagram illustrating an example of a hardware configuration of the client and the server according to the first embodiment.

Subsequently, a configuration of hardware of the client 1 and the server 2 will be described with reference to FIG. 5. FIG. 5 is a diagram illustrating an example of a hardware configuration of the client and the server according to the first embodiment.

The client 1 includes a CPU 10 that executes a program manipulation, a RAM 20 that is a temporary storage memory, an input device 50 such as a keyboard, and a MAC (media access control)/PHY 40 that executes data transmission and reception over the network.

On the other hand, the server 2 includes a CPU 11 that executes the program manipulation, a RAM 21 that is a temporary storage memory, a ROM 31 that is an unrewritable nonvolatile memory, and a MAC/PHY 41 that executes data transmission and reception over the network.

Also, the client 1 and the server 2 are connected to each other through the MAC/PHY 40 and the MAC/PHY 41 over the network.

First, the hardware configuration of the client 1 will be described. The respective processors of the client 1 illustrated in FIG. 3 are executed by the CPU 10 and the RAM 20. The input unit 750 operates the input device 50 as an external interface, and acquires the password input by the user.

The random number A and the random number B generated by the random number generator 500 (random number generating means), and the common key generated by the common key generator 800 are saved in the RAM 20. From the viewpoint of security, it is preferable that the random numbers A, B and the common key are erased immediately when becoming unnecessary.

The public key E and the public key N acquired from the server 2 by the SSL negotiation unit 400 are also saved in the RAM 20. The public key may be overwritten when a new public key has been acquired, and there is no need to erase the public key immediately when the public key becomes unnecessary.

The MAC/PHY 40 is configured by a hardware that controls the network communication, and realizes the network control device 100.

Subsequently, the hardware configuration of the server 2 will be described. The respective processors of the server 2 illustrated in FIG. 3 are executed by the CPU 11 and the RAM 21.

The random number A and the random number B acquired from the client 1, and the common key generated by the common key generator 810 are saved in the RAM 21. From the viewpoint of security, it is preferable that the random numbers A, B and the common key are erased immediately when becoming unnecessary.

The public key D and the public key N, and the password are saved in the ROM 31, but may be transferred into the RAM 21 when used. From the viewpoint of security, it is preferable that the secret key D is saved in a memory high in security such as a tamper-resistant device.

The MAC/PHY 41 is configured by a hardware that controls the network communication, and realizes the network control device 110.

(Second Embodiment)

Figure 6:
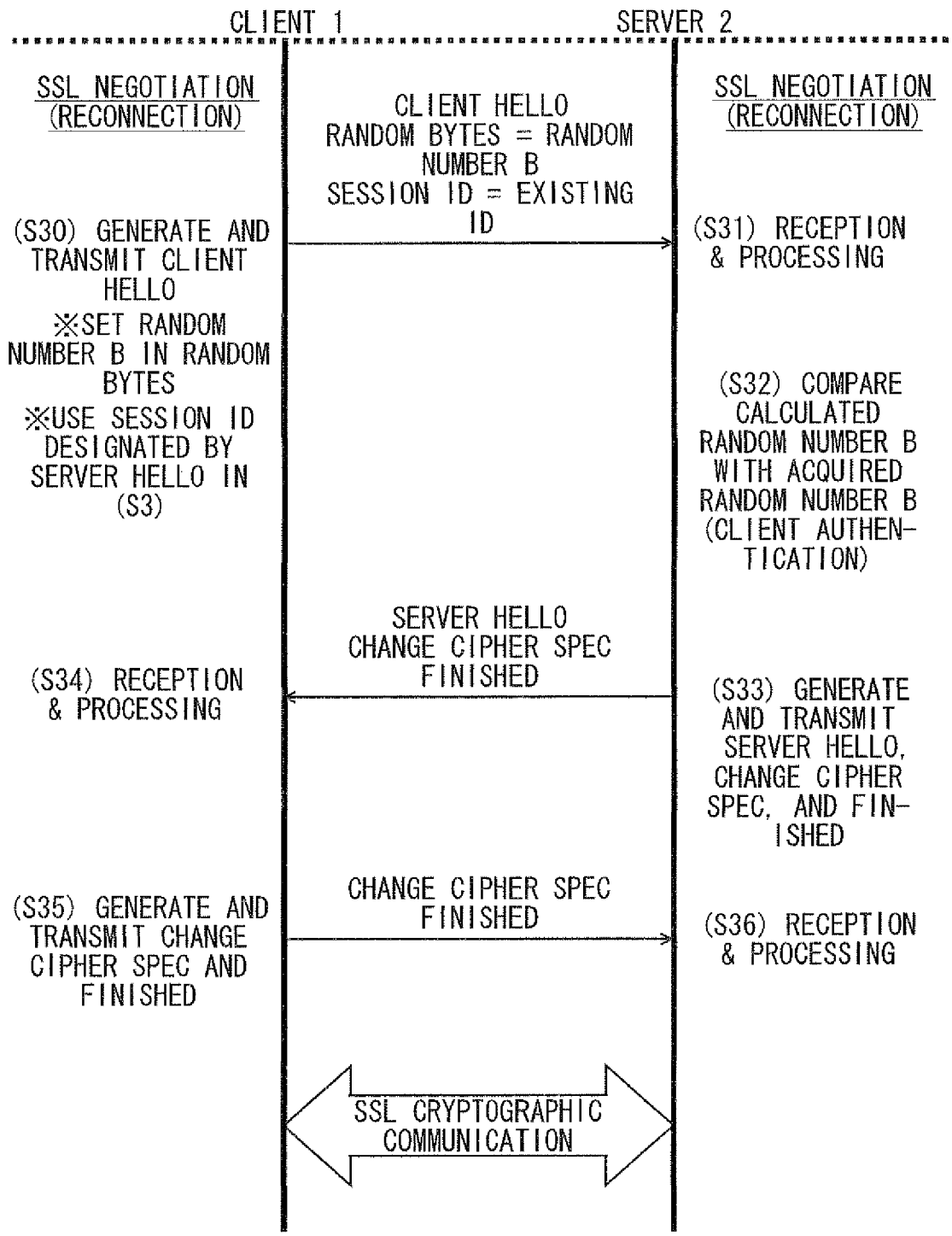
FIG. 6 is a sequence diagram illustrating a PAKE authentication according to a second embodiment.

Hereinafter, a second embodiment will be described with reference to FIG. 6. FIG. 6 is a sequence diagram illustrating a PANE authentication according to the second embodiment. Specifically, the procedures of Step S25 and the subsequent steps are different from the first embodiment. In the first embodiment, the client presents the random number B as data to the server. On the other hand, in this embodiment, the client 1 presents the random number B in the SSL/TLS negotiation to the server 2. Hereinafter, the procedures of Step S25 and the subsequent steps in the first embodiment are described as Steps S30 to S36 in this embodiment.

The client 1 conducts reconnection of SSL on the server 2. Specifically, the client 1 sets a session ID designated by the Server Hello received in Step S4 for the session ID, generates the Client Hello in which the random number B is set in random bytes, and transmits the Client Hello to the server 2 (Step S30). Because of the reconnection of the SSL/TLS, the master secret that has been already generated is used for generation of the common key.

Also, when a TCP port is not closed once before the SSL is renegotiated, in the subsequent SSL/TLS negotiation, the data part of the message is encrypted with the common key. However, for simplification of description, it is assumed that the data part of the message is unencrypted for description.

In this example, the random number B is set in the random bytes. However, a setting portion of the random number B is not limited to this case. For example, the random number B may be inserted into other portions of the respective messages used in the SSL/TLS negotiation, such as extra data of the Client Hello.

The server 2 receives and treats the Client Hello transmitted from the client 1 (Step S31).

The server 2 compares (checks) the random number B calculated and held by itself with the random number B acquired from the Client Hello. If identical, the client 1 can determine that the client 1 is the authorized client knowing the password. As a result, the client authentication is implemented (Step S32).

Then, the server 2 generates and transmits the Server Hello, the Change Cipher Spec, and the Finished to the client 1 (Step S33).

The client 1 receives and treats those messages (Step S34). Then, the client 1 generates and transmits the change chipper spec and the Finished to the server 2 (Step S35). The server 2 receives and treats those messages (Step S36).

In this embodiment, the reconnection of the SSL/TLS, that is, the client authentication is conducted immediately after the SSL/TLS negotiation. However, the client authentication may be conducted at any time. At a time point when the client authentication becomes necessary, the client authentication may be conducted in response to a sign from the server 2.

The sequence of SSL/TLS negotiations illustrated in FIG. 6 all conform to the specification of the SSL/TLS cryptographic communication.

Similarly, in this embodiment, a data format transmitted or received over the network conforms to the specification of the SSL/TLS cryptographic communication (although the Encrypted PreMaster Secret in FIG. 6 and the Finished transmitted by the client 1 do not conform to the SSL/TLS cryptographic communication, a third party cannot determine whether those messages conform to the SSL/TLS cryptographic communication, or not, because of the encrypted data). Therefore, similarly, in this embodiment, the SSL/TLS negotiation illustrated in FIG. 6 looks like a normal SSL/TLS negotiation seen from the third party.

Accordingly, if the firewall accepts the SSL/TLS cryptographic communication, the PAKE authentication can be conducted without blocking a communication.

Moreover, although the PAKE authentication is conducted in the SSL/TLS cryptographic communication, since the public key encryption is implemented only once, a load on the device is small.

This embodiment has additional advantages as compared with the first embodiment.

As usual, the application program that conducts the SSL/TLS cryptographic communication realizes the SSL/TLS cryptographic communication function by using the SSL/TLS cryptographic communication module such as an open SSL different from the application program.

In this embodiment, the random number B, that is, the authentication data is all presented in the SSL/TLS negotiation. Accordingly, once the application program supplies the password to the SSL/TLS cryptographic communication module, then the SSL/TLS cryptographic communication module can be all executed. For that reason, the configuration of the application program is not complicated.

In this embodiment, the random number B is presented by the reconnection of the SSL/TLS. Alternatively, the normal SSL/TLS negotiation may be once more conducted where the random number B is presented. However, in this method, the public key encryption must be executed twice, and a load on the device becomes large. Also, when the normal SSL/TLS negotiation is again conducted, the premaster secret or the master secret generated in the previous SSL/TLS negotiation can be presented instead of the random number B. However, this is not preferable because a message forgery in the previous SSL/TLS negotiation cannot be checked.

In this example, the reconnection of the SSL/TLS is conducted. A load of the reconnection of the SSL/TLS is very small as compared with the public key encryption, and therefore is not problematic from the viewpoint of performance.

From the above viewpoint, the above-mentioned embodiment has been devised to solve the above problems, and an object of the embodiments is to reduce a load of the CPU while suppressing the man-in-the-middle attack inexpensively and simply by the aid of the PAKE authentication in the widespread SSL/TLS cryptographic communication.

Under the circumstances, there is provided in the above embodiment a cryptographic communication apparatus for conducting a key exchange procedure with another cryptographic communication apparatus that shares a password with the cryptographic communication apparatus, the cryptographic communication apparatus including: a random number generator that generates a first random number and a second random number; a first encryption unit that encrypts information that is based on the first random number by the aid of a public key of the another cryptographic communication apparatus; a second encryption unit that encrypts the information that is based on the first random number encrypted by the first encryption unit, by the aid of the password; a third encryption unit that encrypts information that is based on the second random number by the aid of the first random number; and a transmitter that transmits a first signal and a second signal to the another cryptographic communication apparatus, the first signal including information that is based on the first random number encrypted by the second encryption unit, and the second signal including information that is based on the second random number encrypted by the third encryption unit.

According to the cryptographic communication apparatus, another cryptographic communication apparatus can be authenticated by the aid of the password during the key exchange procedure. Because the password authentication is thus conducted in combination during the key exchange procedure, a load of the decryption procedure using the secret key of the public key encryption overlapping between the key exchange procedure and the password authentication procedure on the apparatus can be reduced.

Also, the cryptographic communication apparatus according to the above-mentioned embodiment may be configured so that the transmitter sequentially transmits the first signal and the second signal to the another cryptographic communication apparatus.

According to the configuration of the cryptographic communication apparatus, another cryptographic communication apparatus can be authenticated by the aid of the second random number.

Also, because the known data is encrypted with the second random number, the first signal that transmits the information that is based on the first random number and the second signal for conducting the authentication can be transmitted at the same time without waiting for the calculation result from another cryptographic communication apparatus. That is, the password authentication with another cryptographic communication apparatus can be conducted with a reduction in time.

Also, the cryptographic communication apparatus according to the above-mentioned embodiment may be configured so that the third encryption unit encrypts data known by the another cryptographic communication apparatus by the aid of the first random number and the second random number.

According to the configuration of the cryptographic communication apparatus, another cryptographic communication apparatus can be authenticated when another cryptographic communication apparatus calculates the second random number according to the known data and the first random number.

Also, the cryptographic communication apparatus according to the above-mentioned embodiment may be configured to further include a receiver that receives a signal from the another cryptographic communication apparatus, in which the transmitter transmits the second random number to the another cryptographic communication apparatus when the receiver receives a signal proving that the another cryptographic communication apparatus has the password from the another cryptographic communication apparatus.

According to the configuration of the cryptographic communication apparatus, because another cryptographic communication apparatus can be notified that the cryptographic communication apparatus holds the second random number, the cryptographic communication apparatus enables another cryptographic communication apparatus to authenticate the password of the subject apparatus.

Also, the cryptographic communication apparatus according to the above-mentioned embodiment may be configured so that the known data includes a communication history in the key exchange procedure between the cryptographic communication apparatus and the another cryptographic communication apparatus.

According to the configuration of the cryptographic communication apparatus, another cryptographic communication apparatus can calculate its communication history from the communication history between the corresponding apparatuses. For that reason, another cryptographic communication apparatus can confirm, for example, whether the cryptosystem has been replaced with another one by the mala fide third party, or not.

Also, the cryptographic communication apparatus according to the above-mentioned embodiment may be configured so that the transmitter transmits the first signal as a key exchange signal on the basis of SSL handshake, and transmits the second signal as a verification signal of the second random number on the basis of SSL handshake.

According to the configuration of the cryptographic communication apparatus, the first signal and the second signal can be transmitted to another cryptographic communication apparatus regardless of checking of the firewall that allows a protocol of the SSL handshake to pass therethrough. That is, the password of another cryptographic communication apparatus can be inexpensively authenticated on the basis of the SSL handshake.

Also, in a cryptographic communication system for conducting a key exchange procedure between a first cryptographic communication apparatus and a second cryptographic communication apparatus that shares a password with each other, described in the above-mentioned embodiment, the first cryptographic communication apparatus includes a random number generator that generates a first random number and a second random number, a first encryption unit that encrypts information that is based on the first random number by the aid of a public key of the second cryptographic communication apparatus, a second encryption unit that encrypts the information that is based on the first random number encrypted by the first encryption unit, by the aid of the password, a third encryption unit that encrypts information that is based on the second random number by the aid of the first random number, and a transmitter that transmits a first signal and a second signal to the second cryptographic communication apparatus, the first signal including the information that is based on the first random number encrypted by the second encryption unit, and the second signal including the information that is based on the second random number encrypted by the third encryption unit. In the cryptographic communication system, the second cryptographic communication apparatus includes a receiver that receives the first signal and the second signal, a first decryption unit that decrypts the information that is based on the first random number encrypted by the second encryption unit by a secret key paired with the public key and the password to acquire the first random number, and a second decryption unit that calculates the second random number according to the information that is based on the second random number encrypted by the third encryption unit by the aid of the first random number acquired by the first decryption unit.

According to the cryptographic communication system, another cryptographic communication apparatus can be authenticated by the aid of the password during the key exchange procedure. Because the password authentication is thus conducted in combination during the key exchange procedure, a load of the decryption procedure using the secret key of the public key encryption overlapping between the key exchange procedure and the password authentication procedure on the apparatus can be reduced.

Also, in the cryptographic communication system according to the above-mentioned embodiment, in the PAKE authentication between a client and a server (a side holding secret key is called "server") where the client transmits a public key and a random number A encrypted with a password to the server, the client includes a random number generation unit and a common key encryption unit. The client generates a random number B by the aid of the random number generation unit, encrypts the random number A (with data generated from random number A) with the random number B (with data generated from random number B) as the common key by using the common key encryption unit, and delivers the random number A encrypted by the random number B to the server before confirming that the server holds the password. When the client can confirm that the server holds the password, the client presents the random number B (with data generated from random number B) to the server, and transmits that the client understands the random number A, that is, the password to the server, that is, conducts the client authentication.

According to the above configuration, the client authentication can be conducted by using the random number B which is an arbitrary value. The random number B can be used as a one-time-password.

Also, the above presenting method is compatible with the SSL/TLS negotiation. In the SSL/TLS negotiation, the client transmits data (Client Key Exchange) encrypted with the public key encryption together with the verification data (Finished) at the same time. At that time point, the client has not yet acquired the verification data (Finished) of the server. For that reason, when the PAKE authentication is conducted together with the SSL/TLS negotiation, offline attack is accomplished.

However, according to the cryptographic communication system of the above-mentioned embodiment, since the verification data (Finished) transmitted by the client is encrypted with the random number B, the danger is low. Accordingly, the password authentication (for example, PAKE authentication) can be implemented in the SSL/TLS negotiation.

As a result, since the SSL/TLS negotiation and the PAKE authentication are conducted by one public key encryption, a load on the CPU in the server can be reduced, and the server costs can be remarkably reduced.

If the PAKE authentication is thus conducted in the SSL/TLS negotiation, a risk that the communication is interrupted by a communication device such as a firewall is also reduced.

In order to solve the above problem, in the cryptographic communication system according to the above-mentioned embodiment, the client presents the random number B to the server in the SSL/TLS negotiation (SSL/TLS handshake).

According to the above configuration, when not application program but the SSL/TLS cryptographic communication module such as an open SSL conducts the cryptographic communication procedure, the configuration of the application program can be more simplified. Once the application program delivers the password to the SSL/TLS cryptographic communication module, then the SSL/TLS cryptographic communication module can conduct all the procedures.

Also, in the cryptographic communication system according to the above-mentioned embodiment, the client presents the random number B to the server in the reconnection of the SSL/TLS.

According to the above configuration, since the SSL/TLS negotiation and the PAKE authentication can be conducted by one public key encryption, a load on the CPU of the server can be reduced, and the server costs can be remarkably reduced.

Also, in the cryptographic communication system according to the above-mentioned embodiment, the server finds out the random number B (with data generated from random number B) from the random number A (with data generated from random number A) encrypted by the common key encryption means, which is delivered from the client, and the random number A (with data generated from random number A). Then, the server compares the found random number B (with data generated from random number B) with the random number B (with data generated from random number B) delivered from the client to conduct the client authentication.

According to the above configuration, since the server has only to store only the random number B which is the authentication data, the configuration of the SSL/TLS cryptographic communication module on the server side can be simplified.

Also, in the cryptographic communication system according to the above-mentioned embodiment, the common key encryption unit conducts the XOR procedure.

According to the above configuration, the SSL/TLS cryptographic communication module on the server side can find out the random number B very simply and rapidly.

Also, in the cryptographic communication system according to the above-mentioned embodiment, in order that the client presents the random number B to the server, the information that can be held or generated by the server is encrypted with the random number B (with data generated from random number B) as the common key, by using the common key encryption unit, and delivered to the server. The server also has the common key encryption unit equivalent to that of the client. The server encrypts the information that can be held or generated by the server with the random number B (with data generated from random number B) as the common key, by using the common key encryption unit, and compares the information encrypted by itself with the information encrypted by the client to confirm that the client understands the random number B.

According to the above configuration, the client can notify the server of the known information without any forgery. Although being described in detail in the following embodiment, in the PAKE authentication, because of the offline attack, known information understood by the third party is not embedded in a random number encrypted with the public key. However, in the SSL/TLS negotiation, in order to suppress the version rollback attacks, known information such as the version information has to be embedded in the random number encrypted with the public key.

Under the circumstances, as in the cryptographic communication system of the above-mentioned embodiment, if the known information such as the version information is encrypted with the random number B and transmitted, there is no need to embed the known information in the random number encrypted with the public key. Therefore, both of the PAKE authentication and the SSL/TLS negotiation can be performed. The mala fide third party knowing no value of the random number B cannot create pseudo version information encrypted with the random number B, and therefore, it is impossible that the mala fide third party forges the version information to the pseudo version information, that is, conducts the version rollback attacks, without being noticed by the client or the server.

Also, in the cryptographic communication system according to the above-mentioned embodiment, in order that the client presents the random number B to the server, with the random number B (with data generated from random number B) as the common key, the information that can be held or generated by the server is encrypted by using the common key encryption unit, and delivered to the server. The server also has the common key encryption unit equivalent to that of the client. The server decrypts the information encrypted with the random number B (with data generated from random number B) as the common key, which can be held or generated by the server, by using the common key encryption unit, and compares the information that can be held or generated by itself with the decrypted information to confirm that the client understands the random number B.

According to the above configuration, the client can notify the server of specific information without any forgery. Although being described in detail in the following embodiment, in the PAKE authentication, because of the offline attack, known information understood by the third party is not embedded in a random number encrypted with the public key. However, in the SSL/TLS negotiation, in order to prevent the version rollback attacks, known information such as the version information has to be embedded in the random number encrypted with the public key.

Under the circumstances, as in the above-mentioned embodiment, if the known information such as the version information is encrypted with the random number B and transmitted, there is no need to embed the known information in the random number encrypted with the public key. Therefore, both of the PAKE authentication and the SSL/TLS negotiation can be performed. The mala fide third party knowing no value of the random number B cannot create pseudo version information encrypted with the random number B, and therefore, it is impossible that the mala fide third party forges the version information to the pseudo version information, that is, conducts the version rollback attacks, without being noticed by the client or the server.

Because the password authentication is conducted in combination during the key exchange procedure, a load of the decryption procedure using the secret key of the public key encryption overlapping between the key exchange procedure and the password authentication procedure can be reduced.

The PAKE authentication according to the above-mentioned embodiment can be implemented during the SSL/TLS negotiation, and therefore is compatible with the communication device such as the firewall. Moreover, because the number of public key encryptions can be limited to one, the server costs can be reduced, which is thus useful.

The present application is based upon and claims the benefits of Japanese patent application No. 2011-101076 filed on Apr. 28, 2011, the contents of which are incorporated by reference in its entirety.

What is claimed is:

1. A cryptographic communication apparatus for conducting a key exchange procedure with another cryptographic communication apparatus that shares a password with the cryptographic communication apparatus, the cryptographic communication apparatus comprising:
   a random number generator that generates a first random number and a second random number;
   a first encryption unit that encrypts information that is based on the first random number by the aid of a public key of the another cryptographic communication apparatus;
   a second encryption unit that encrypts the information that is based on the first random number encrypted by the first encryption unit, by the aid of the password;
   a third encryption unit that encrypts information that is based on the second random number by the aid of the first random number; and
   a transmitter that transmits a first signal and a second signal to the another cryptographic communication apparatus, the first signal including the information that is based on the first random number encrypted by the second encryption unit, and the second signal including the information that is based on the second random number encrypted by the third encryption unit.

2. The cryptographic communication apparatus according to claim 1, wherein
   the transmitter sequentially transmits the first signal and the second signal to the another cryptographic communication apparatus.

3. The cryptographic communication apparatus according to claim 1, wherein
   the third encryption unit encrypts data known by the another cryptographic communication apparatus by the aid of the first random number and the second random number.

4. The cryptographic communication apparatus according to claim 2, further comprising a receiver that receives a signal from the another cryptographic communication apparatus, wherein
   the transmitter transmits the second random number to the another cryptographic communication apparatus when the receiver receives a signal proving that the another cryptographic communication apparatus has the password from the another cryptographic communication apparatus.

5. The cryptographic communication apparatus according to claim 3, wherein
   the known data includes a communication history in the key exchange procedure between the cryptographic communication apparatus and the another cryptographic communication apparatus.

6. The cryptographic communication apparatus according to claim 5, wherein
   the transmitter transmits the first signal as a key exchange signal on the basis of SSL handshake, and transmits the second signal as a verification signal on the basis of SSL handshake.

7. A cryptographic communication system for conducting a key exchange procedure between a first cryptographic communication apparatus and a second cryptographic communication apparatus that share a password with each other, wherein
   the first cryptographic communication apparatus includes:
   a random number generator that generates a first random number and a second random number;
   a first encryption unit that encrypts information that is based on the first random number by the aid of a public key of the second cryptographic communication apparatus;
   a second encryption unit that encrypts the information that is based on the first random number encrypted by the first encryption unit, by the aid of the password;
   a third encryption unit that encrypts information that is based on the second random number by the aid of the first random number; and
   a transmitter that transmits a first signal and a second signal to the second cryptographic communication apparatus, the first signal including the information that is based on the first random number encrypted by the second encryption unit, and the second signal including the information that is based on the second random number encrypted by the third encryption unit, and
   the second cryptographic communication apparatus includes:
   a receiver that receives the first signal and the second signal;
   a first decryption unit that decrypts the information that is based on the first random number encrypted by the second encryption unit by a secret key paired with the public key and the password to acquire the first random number; and a second decryption unit that calculates the second random number according to the information that is based on the second random number encrypted by the third encryption unit by the aid of the first random number acquired by the first decryption unit.

* * * * *